March 2, 1965

F. J. ERNST, JR., ET AL 3,171,324

BOMBING METHOD

Filed Sept. 9, 1953

INVENTORS
FREDERICK J. ERNST, JR.
FRANK S. PRESTON
BY
Harry L. Skeuier
ATTORNEY

United States Patent Office 3,171,324
Patented Mar. 2, 1965

3,171,324
BOMBING METHOD
Frederick J. Ernst, Jr., Ardsley, and Frank S. Preston, Tarrytown, N.Y., assignors, by mesne assignments, to United Aircraft Corporation, East Hartford, Conn., a corporation of Delaware
Filed Sept. 9, 1953, Ser. No. 379,128
6 Claims. (Cl. 89—1.5)

Our invention relates to a method of bombing and more particularly to a method of bombing to be used when automatic computing equipment is inoperative or unavailable.

Bombing directors presently in use are provided with bombing data computers which rapidly and automatically perform the necessary calculations to enable the bombardier to drop the bombs with great accuracy. However, in the event that the computer is, for any reason, inoperative or unavailable, no satisfactory method has been devised by means of which the bombs can be accurately dropped. We have provided a method for dropping bombs with considerable accuracy when the computer which automatically calculates bombing data is inoperative or for any reason not available. Our bombing method employs only a stop watch, range and bearing measuring equipment and special bombing tables. By use of our method the release time is determined without calculations or reference to tables after the timing or bombing run has been started. In addition, the time during which the plane must be held at the predetermined ground speed and altitude for the run is very short so that the error due to change in ground speed after the release point has been predetermined is small. Since the release point is determined solely by a time interval, should the target be obscured at the release point, accurate bombing, is nevertheless, possible. Our method permits the pilot to make his timing run during a period prior to the time when the bombing run is started.

One object of our invention is the provision of a method of bombing adapted to be used when automatic computing equipment is inoperative or unavailable.

Another object of our invention is the provision of a method of bombing without the necessity of using automatic computing equipment and which is adapted to be used with either a radar or an optical sighting system.

A further object of our invention is the provision of a method of bombing wherein no calculations or reference to tables is necessary after the run has been started.

A still further object of our invention is the provision of a method of bombing in which the timing run may be made during an interval of time prior to the time when the actual bombing run is commenced.

Other and further objects of our invention will appear from the following description.

In general, to carry out our method of bombing, we estimate the ground speed and select the altitude for the bombing run. Then we obtain the time of fall and trail of the bomb from standard ballistic tables known to the art. Two predetermined points on the selected run are obtained from special bombing tables. These points may be determined either by slant range or by elevation angle. The aircraft is then directed on a course over the target while the predetermined altitude and estimated ground speed are maintained. We then measure the time of flight of the aircraft along the course between the two predetermined points and determine the difference between the time of flight from the first to the second of the two points and the time of fall of the bomb. The bomb is released at a time after the aircraft passes the second of the two points, which is equal to the difference in time between the time of flight from the first to the second of the two points and the time of fall of the bomb. If desired, the course on which the target is to be approached may be predetermined to aid in the estimate of ground speed in view of wind direction.

In the accompanying drawings which form part of the instant specification and which are to be read in conjunction therewith and in which like reference numerals are used to indicate like parts in the various views.

Figure 1:
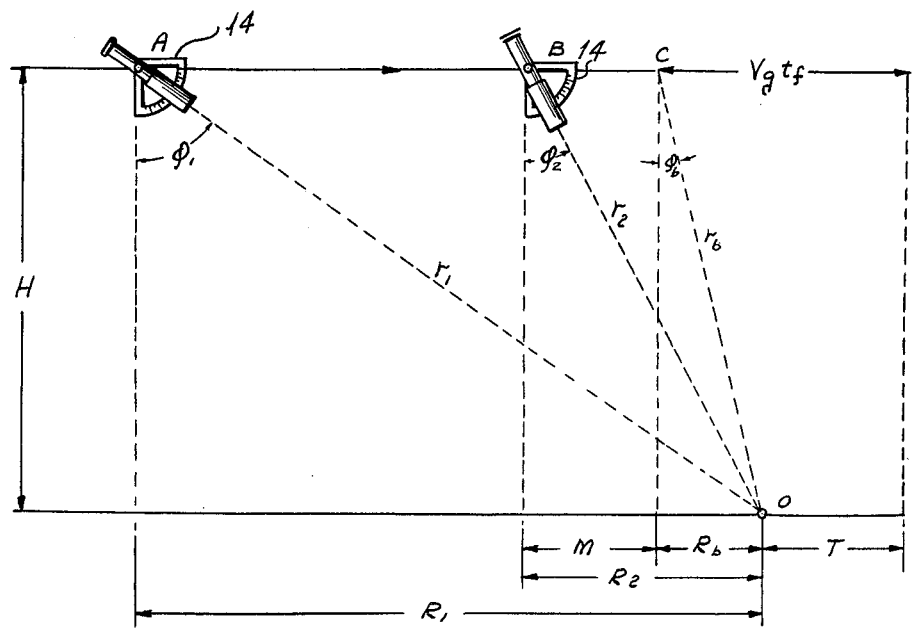
FIGURE 1 is a schematic view showing the relationship between the release point and the predetermined points of our method during a timing and bombing run.

More particularly, referring now to the drawings, in FIGURE 1 let:

0 = the target point
A = the first predetermined point along the bombing course
B = the second predetermined point along the bombing course
C = the point at which the bomb should be released to strike the target
T = the value of the trail
$R_1$ = the ground range from a point directly below point A to the target
$R_2$ = the ground range from a point directly below point B to the target
$R_b$ = the ground range from a point directly below point C to the target.

It can be demonstrated that by selecting two particular points along the bombing run, which points may be defined by slant range or elevation angle, the release point may be determined solely by a time measurement, where the ground speed $V_g$ remains constant during the run. The time of flight, $t$, between the two predetermined points A and B is related to the time of flight $\Delta t$ between point B and the release point C as follows:

(1) $$V_g = \frac{R_2 - R_b}{\Delta t} = \frac{R_1 - R_2}{t}$$

From an examination of FIGURE 1 and Equation 1, it will be apparent that:

(2) $$R_b = V_g t_f - T = \left(\frac{R_1 - R_2}{t}\right) t_f - T$$

and (3) $$R_b = R_2 - \frac{\Delta t (R_1 - R_2)}{t}$$

Substituting the expression for $R_b$ of Equation 2 in Equation 3 and solving for $\Delta t$, we find:

(4) $$\Delta t = \left(\frac{R_2 + T}{R_1 - R_2}\right) t - t_f$$

Since trail is constant for a given bomb on a given run, we may select the values of $R_1$ and $R_2$ such that the coefficient of $t$ will be any desired constant. The selection of these values will determine the location along the bombing run of points A and B, and we may write:

(5) $$\Delta t = Kt - t_f$$

Therefore, it can be seen from Equation 5 that if we have determined $t$ by observations at points A and B, the release point C may be determined by only a time measurement between points B and C. No calculations need be made by the bombardier and the bomb release will be fully automatic. It is convenient to select such values of $R_1$ and $R_2$, that with a given trail the constant K becomes unity.

To use our method of bombing, the bombardier first estimates the ground speed and selects the altitude at which the run is to be made. From the estimated ground speed the bombardier estimates air speed corresponding to the ground speed. This must be done because standard ballistic tables employ air speed as an argument. With the value of altitude selected and the value of air speed estimated from the selected ground speed, he enters the standard ballistic tables to obtain the time of fall and trail for the type bomb to be used. He then enters our special bombing tables (to be described in detail hereinafter) with the value of ground speed, altitude and trail to obtain the two predetermined points on the bombing run. Since points along the bombing run can be defined either by slant range or elevation angle, our special bombing tables give two sets of values which define the points, one set being slant ranges and the other set being elevation angles. If the radar system is operative, the slant range values may be employed to determine the points, or in the event that radar is not operative or available, the values of elevation angle may be used and some optical sighting device, as for example, the device 14 illustrated in FIGURE 1, may be used. These sighting devices are known to the art and are generally stabilized by gyroscopes.

Figure 2:
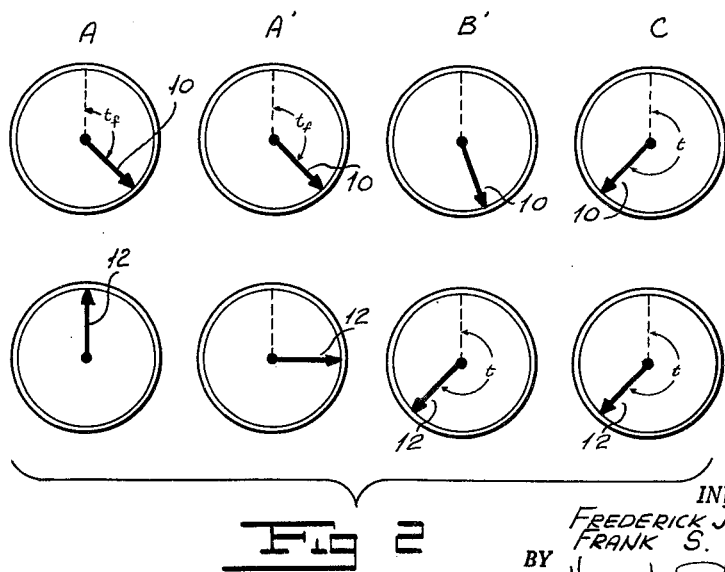
FIGURE 2 is a view showing the relative positions of the first and second stop watch hands at various points during a bombing run.

The time of flight between points A and B and the difference between this time of flight and the time of fall of the bomb may be measured in numerous ways. For example, if two stop watch hands are used, as shown in FIGURE 2, before the run is commenced, a first stop watch hand 10 is set to time of fall and a second stop watch hand 12 set to zero.

The next step in our bombing method is that of directing the aircraft on a course over the target. The approach course may be predetermined to aid in the estimate of ground speed in view of wind direction if desired. That is, the aircraft must be directed on such heading that the aircraft course over the ground will be for the target. In setting the heading we must, of course, compensate for drift. During the time the run is made, the aircraft must be maintained at the predetermined altitude and the predetermined value of air speed corresponding to estimated ground speed. By use of the radar to measure the slant range $r_1$, or the optical sighting means 14 to measure the elevation angle $\phi_1$, at point A, the bombardier can determine when point A on the run has been reached. When the aircraft arrives at point A, the second stop watch hand 12 is started. The relative positions of the first and second stop watch hands at a time before the run is started and at point A in FIGURE 1 are shown under reference character A in FIGURE 2. The relative positions of the hands at some point between points A and B in FIGURE 1 are shown under reference character A'. Again by use of radar to measure the slant range $r_2$ or the visual sighting means 14 to measure the elevation angle $\phi_2$ at point B, the bombardier determines when point B has been reached. At this time the bombardier stops the second stop watch hand 12 and starts the first stop watch hand 10. The relative positions of hands 10 and 12 at a point between points B and C in FIGURE 1 is indicated under reference character B' in FIGURE 2. When hand 10 reaches a time which is the time indicated by hand 12, point C has been reached and the bomb should be released. The positions of hands 10 and 12 are shown under reference character C in FIGURE 2. If both hands are on a single face, they will coincide.

It is to be noted that we have solved Equation 5 by use of the stop watch hands 10 and 12. A special bombing watch may be employed which has a pair of individually actuatable hands. If such a watch is used, the release point is determined when the hands exactly coincide. When the value of the coefficient $$K = \left( \frac{R_2 + T}{R_1 - R_2} \right)$$

is unity, the speed of the stop watch hands will be the same and the values of slant range or elevation angle given by our special bombing tables will be true values. If some other value, for example, the number 2 is selected for the coefficient, other special tables must be employed to provide values for point A and point B. As a result, the value of $t$ in Equation 5 must be multiplied by 2. This multiplication can be accomplished without calculation, merely by using a second stop watch hand 12 which moves twice as fast as the first stop watch hand 10. In such a case the bombing run will be shortened. It is obvious that we could employ two separate stop watches to solve Equation 5, but for convenience we prefer to use a special bombing watch.

When a watch having a pair of hands movable, for example, in a clockwise direction is employed, a first one of the hands may be set to a value of time corresponding to the time of fall in a counterclockwise direction from a reference mark. When the aircraft reaches point A, the first hand is started and moves in a clockwise direction. When point B has been arrived at, the first hand is stopped and the second hand started from the reference mark. When the second hand coincides with the first hand, the bombs are released. To facilitate the setting of the first hand to a value in the counterclockwise direction corresponding to the value of time of fall, we may conveniently employ a watch having a dial graduated in a counterclockwise direction and actuate the first hand to move in a clockwise direction until the dial indication corresponding to time of fall is reached.

The time $t$, which is the time it takes to travel between points A and B on the bombing course may be determined, if we desire, at a time prior to the time the actual run is commenced. That is, once we have located points A and B by the values obtained from the special bombing tables, we could travel on a simulated course at the predetermined speed and altitude and measure the time with reference to some object on the earth acting as a simulated target removed from the actual target. When the actual target is approached, we can return to the predetermined speed, course, and altitude at some point prior to the time point B is reached. When point B is reached, the run would be made as before. It is possible to do this because the measurement of $t$ may be stored up on the second stop watch hand. This is not the preferred method, however, because the conditions at the place where $t$ is actually measured may not be the same as the conditions between the points A and B actually on the run so that the possibilities of an inaccurate measure of $t$ are increased.

Each table of our special bombing tables is calculated for a constant trail and divided in rows for each five thousand feet of altitude between ten thousand feet and forty thousand feet and columns for each estimated ground speed in twenty-knot intervals between 160 knots and 600 knots. The equation from which $R_2$ is calculated is:

(6) $\qquad R_2 = M + R_b = M + V_g t_f - T$ where M is the distance along the earth's surface covered by the aircraft during the time $\Delta t$.

It is generally desirable that the time for $\Delta t$ be at least five seconds, so that we may write:

(7) $\qquad R_2 = V_g (t_f + 5) - T$

The values in $V_g$ for the tables are given in twenty-knot intervals. We assume that the pilot can measure or estimate $V_g$ to within twenty knots. Hence, there is a possibility that the value of $V_g$ may be thirty knots off the correct value. If the actual value of $V_g$ were greater than that used in the table, $\Delta t$ would be smaller than five seconds. To obviate this possibility and to ensure a bombing run having a $\Delta t$ greater than five seconds, we calculate $R_2$ for a value $V_g' = V_g + 30$ knots. Since $t_f$ also varies with the ballistic coefficient, the coefficient corresponding to the largest value of $t_f$ is used, that is, $C = 1$. The value of $t_f$ also varies with air speed $V_a$, and since for any $V_g$, $V_a$ is within $V_g \pm 150$ knots, the maximum $t_f$ for a given $V_g$ is used. Since $t_f$ does not vary appreciably with $V_a$, $t_f$ for 450 knots air speed, and $C=1$ is used for the purpose of calculating our special bombing tables. This assures that $\Delta t$ is not less than five seconds and greatly simplifies the calculations. Since $V_g$ is selected at twenty-knot intervals, we write the general equation from Equation 7;

(8) $\quad R_2 = V_g'(t_f+5) + N \Delta V_g'(t_f+5) - T$ where $N = 0, 1, 2$, etc., and $V_g'$ is the selected base value of $V_g + 30$, and $\Delta V_g'$ is the interval between $V_g$ values in the table which may have any convenient value such, for example, as 20 knots. At any given altitude:

(9) $\quad \tan \phi_2 = \dfrac{R_2}{H} = \dfrac{V_g'(t_f+5)}{H} + N\dfrac{\Delta V_g'(t_f+5)}{H} - \dfrac{T}{H}$ Equation 9 may be rewritten:

(10) $\quad \tan \phi_2 = A_H + N B_H - \dfrac{T}{H}$ where

(11) $\quad A_H = \dfrac{V_g'(t_f+5)}{H}$ and

(12) $\quad B_H = \dfrac{\Delta V_g'(t_f+5)}{H}$

From the standard ballistic tables, having $V_g$ and $C$, we obtain values of $t_f$ and $T$ for various altitudes at intervals of five thousand feet and calculate $A_H$ and $B_H$. From these values the table can be worked out. The relations from which the remaining values to be obtained for the table can be calculated are:

(13) $\quad r_2 = H \sec \phi_2$

(14) $\quad \tan \phi_1 = 2 \tan \phi_2 + \dfrac{T}{H}$

(15) $\quad r_1 = H \sec \phi_1$

From these relationships the values to be obtained from the table may be calculated and the table set up, for example, as follows:

$$T = 200$$

| H | $V_g=160$ | | | | $V_g=180$ | | | |
|---|---|---|---|---|---|---|---|---|
| | $\phi_1$ | $\phi_2$ | $r_1$ | $r_2$ | $\phi_1$ | $\phi_2$ | $r_1$ | $r_2$ |
| 10,000 | 64.28 | 45.80 | 22,900 | 14,370 | 66.10 | 48.70 | 24,610 | 15,140 |
| 15,000 | 59.25 | 39.82 | 29,500 | 19,500 | 61.37 | 42.83 | 31,300 | 20,400 |
| 20,000 | 55.52 | 35.87 | 35,360 | 24,350 | 57.83 | 38.67 | 37,600 | 25,600 |
| 25,000 | 52.60 | 33.02 | 41,200 | 29,810 | 55.03 | 35.72 | 43,600 | 30,800 |
| 30,000 | 50.20 | 30.80 | 46,800 | 34,860 | 52.82 | 33.52 | 49,590 | 35,940 |
| 35,000 | 48.35 | 29.22 | 53,500 | 40,250 | 50.92 | 31.73 | 55,490 | 41,150 |
| 60,000 | 46.75 | 27.88 | 58,520 | 45,240 | 49.35 | 30.33 | 62,800 | 46,400 | where $V_g$ is in knots, $T$, $H$, $r_1$, and $r_2$ are in feet, and $\phi_1$ and $\phi_2$ are in degrees.

The above fragment of the total table is calculated for $K=1$ in Equation 5 and is repeated over the range of ground speeds at which it may be desired to make the bomb run and a similar sheet of tables for each possible value of trail is prepared. The resultant book of tables forms the special bombing tables employed in our method. Any error introduced in the tables will be the result of rounding off of the values of trail and $t_f$ from the standard ballistic tables and the accuracy of the computations. Since $\tan \phi_2$ is purely arbitrary, it will introduce no error, and it can be demonstrated that the errors introduced by the rounded off values of trail and time of fall are so small as not to affect the accuracy of the method to an appreciable degree.

In summary, when it is desired to use our method of bombing, the bombardier estimates ground speed and selects the altitude at which the run is to be made. He enters standard ballistic tables with the value of air speed corresponding to the estimated value of ground speed and altitude as arguments to obtain the value of time of fall and trail. The value of time of fall is set on the first stop watch hand. If the special watch is used, this first hand is actuated to measure the time of flight between the first and second of the two predetermined points and to simultaneously determine the difference between this time of flight and the time of fall of the bomb. If, however, a pair of hands are employed in the manner illustrated, the first hand is set to time of fall and the second hand measures the time of flight between points A and B. He then enters the book of special bombing tables and locates the page corresponding to the value of trail previously obtained. With the value of estimated ground speed and altitude, he gets two values of elevation angle or slant range which define the points A and B on the bombing course. The pilot directs the airplane over the target at the ground speed and altitude selected for the run. The bombardier then determines when the point A has been reached by a measurement of elevation angle or slant range, depending on whether optical means or radar, respectively, is being used. When point A is reached, the second stop watch hand is started. The bombardier determines when point B has been reached by observation, optically or by radar, and at that point stops the second stop watch hand and starts the first stop watch hand. When the two hands indicate the same time, or coincide, the bomb is dropped. As explained previously, the run between simulated points A and B to determine $t$ of Equation 5 may be made prior to the time the actual run is commenced, provided ground speed is maintained constant and at the predetermined value from point B of the bombing run onward.

Thus it will be seen that we have accomplished the objects of our invention. We have provided an emergency method which may be employed to make an accurate bombing run when the automatic computing equipment is inoperative or unavailable. Our method may be used with either a radar or visual sighting means. Since the time on the actual run during which the plane must be flown straight, level, and at constant speed is very small, the possibility of error is a minimum. With our method the bombardier need make no calculations and need not refer to any tables after the run has been started. In addition, if desired, the timing portion of the run may be made at a considerable distance from the target and the time at which the plane must fly under the predetermined conditions of the run is very small. If the target should become obscured near the end of the run, the time of release is not affected but may be completely automatic.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of bombing including the steps of directing an aircraft on a course over the target at a selected altitude and at a speed corresponding to the estimated ground speed for the bombing run, timing the flight of the aircraft along said course between a pair of points predetermined from said ground speed and said altitude and the trail of a bomb, timing the flight of said aircraft over an interval between the time at which said aircraft passes said second predetermined point and a time equal to the difference between said timed interval of flight between said two predetermined points and the time of fall of a bomb and dropping the bomb at said point corresponding to the time equal to the difference between the timed interval of flight between the two points and the time of fall.

2. A method of bombing as in claim 1 wherein the steps of timing comprise the steps of setting a stop watch hand in one direction from a reference mark to a value of time equal to the time of fall of the bomb, starting the hand and permitting it to move in the opposite direction when the first of said two predetermined points is reached and stopping said hand when the second of said two predetermined points is reached whereby the hand indicates a time measured from said reference mark which is equal to said difference.

3. A method of bombing as in claim 1 wherein the steps of timing comprise the steps of setting a first stop watch hand in one direction from a selected reference mark a distance equal to the time of fall of the bomb, starting the hand to move in the opposite direction when the first of said two predetermined points is reached, stopping said first hand and simultaneously starting a second hand from said reference point when the second of said two predetermined points is reached and wherein the step of dropping the bombs is performed when said second hand coincides with said first hand.

4. A method of bombing as in claim 1 wherein the steps of timing comprise the steps of setting the time of fall on a first stop watch hand and setting a second stop watch hand to zero, starting the second stop watch hand when the first of said two predetermined points along the course is reached and stopping the second stop watch hand and starting the first stop watch hand when the second of the two predetermined points has been reached, such that the time interval between the time indicated by the first stop watch hand at the second of said two predetermined points and the time at which it indicates a time corresponding to the time indicated by the second stop watch hand is equal to the time of travel of the aircraft along the course between the second of the two predetermined points and the release point.

5. A method of bombing including the steps of directing an aircraft on a course over the target at a selected altitude and at a speed corresponding to an estimated ground speed for the bombing run, setting the time of fall of the bomb on a first stop watch hand, setting a second stop watch hand to zero, starting the second stop watch hand when the first of a pair of points on the course predetermined from said estimated ground speed and altitude and trail of the bomb is reached, stopping the second stop watch hand and starting the first stop watch hand when the second of said two predetermined points is reached and dropping the bomb when the time indicated by the first stop watch hand corresponds with the time indicated by the second stop watch hand.

6. A method of bombing, including the steps of directing the aircraft on a course over a simulated target at a selected altitude and estimated ground speed for the bombing run, timing the flight of the aircraft along said course between a pair of points corresponding to points along the bombing run predetermined from said estimated ground speed and altitude and the trail of the bomb, directing the aircraft on the bombing course over the actual target at the selected altitude and estimated ground speed at some point along the bombing run prior to the second of said two predetermined points, timing the flight of said aircraft over an interval between the time at which the aircraft passes said second point and a time which is equal to the difference between the time of flight between said two points on the course and the time of fall of the bomb and releasing the bomb at the end of said timed interval.

References Cited in the file of this patent

UNITED STATES PATENTS

| 1,143,719 | Mackensen | June 22, 1915 |
| 1,157,468 | Eberhard | Oct. 19, 1915 |
| 2,161,081 | Avtschennekoff | June 6, 1939 |

OTHER REFERENCES

"Aircraft Engineering," pp. 244–247, 250, 276–280, September 1942.